March 10, 1925.  
C. O. MERCKEL  
ROD SUPPORT  
Filed June 11, 1924
1,529,265
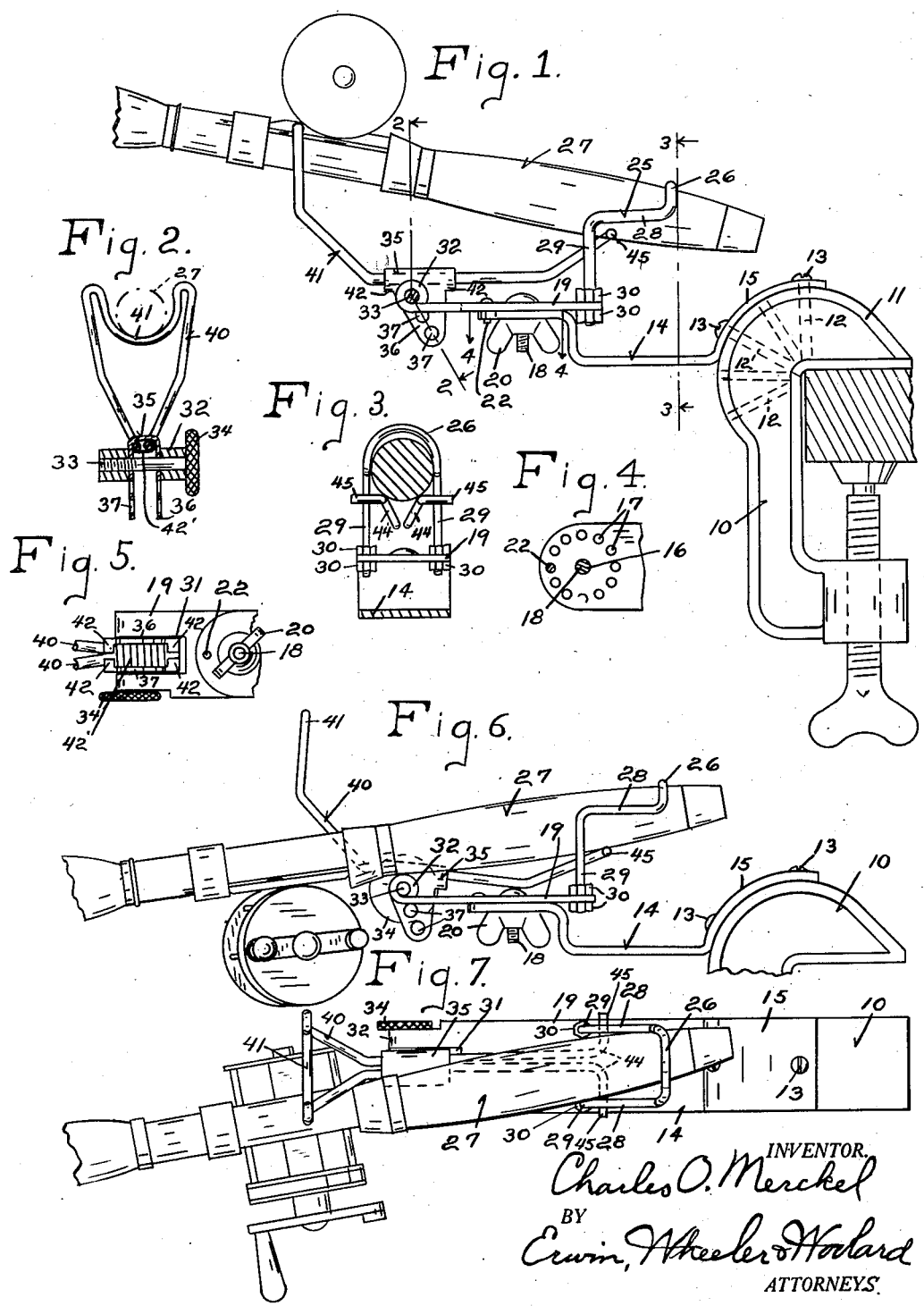
INVENTOR.  
Charles O. Merckel  
BY  
Erwin, Wheeler & Howard  
ATTORNEYS.

Patented Mar. 10, 1925.

1,529,265

UNITED STATES PATENT OFFICE.

CHARLES O. MERCKEL, OF MILWAUKEE, WISCONSIN.

ROD SUPPORT.

Application filed June 11, 1924. Serial No. 719,325.

*To all whom it may concern:*

Be it known that I, CHARLES O. MERCKEL, a citizen of the United States, residing at Milwaukee, county of Milwaukee, and State of Wisconsin, have invented new and useful Improvements in Rod Supports, of which the following is a specification.

This invention relates to a rod support such as is peculiarly adapted to be clamped to a boat, pier or the like and to receive and support any type of fishing rod.

It is one of the important objects of this invention to provide a support of the character above indicated which shall be so designed that a rod may be instantly placed therein or removed therefrom, and while held by the support shall be so firmly secured that there is little or no possibility of the loss of the rod.

It is a further object of this invention to provide in a device of this character a universal mounting adapting the support to be clamped in any conceivable position and nevertheless to receive a rod properly while so clamped.

It is a further object of this invention to provide a novel and improved structure of the above described type which can be cheaply and simply made to operate satisfactorily in the manner for which it is intended.

In the drawings:

Figure 1 is a side elevation of the device embodying this invention.

Figure 2 is a detail view taken on the section indicated at 2—2 in Figure 1.

Figure 3 is a detail view taken on the section indicated at 3—3 in Figure 1.

Figure 4 is a detail view taken on the section indicated at 4—4 in Figure 1.

Figure 5 is a detail view of an inverted portion of the fulcrum mounting shown in Figure 1.

Figure 6 is a side elevation similar to Figure 1, showing the parts in disarranged position.

Figure 7 is a plan view of the parts shown in Figure 6.

Like parts are identified by the same reference characters throughout the several views.

The entire device is preferably mounted upon a C-clamp 10 which is quite largely of ordinary construction, but is provided at 11 with an arcuate clamping flange, as indicated in Figure 1, in which a plurality of radial holes are bored as at 12. Such holes are preferably tapped to receive the securing screws 13. The bracket 14 which carries the rod support proper is provided with an arcuate member 15 complementary to flange 11 and apertured at one or more points so spaced as to register with the tapped apertures 12 in the clamp. It will be obvious that the bracket member 14 may be adjusted arcuately about the clamp as may be desired, and that in a number of positions of adjustment it may be secured to the clamp by means of screws 13. The arcuate extent of the flange 11 is preferably somewhat greater than 90° so that whether the clamp be engaged with a vertical or horizontal object the bracket 14 may nevertheless be adjusted to be horizontal.

The end of bracket 14 is preferably formed with a central aperture 16 and a concentric series of smaller apertures 17. A bolt 18 passes through the bed plate 19 of the support and through aperture 16 in the bracket. A wing nut 20 on bolt 18 permits the bed plate to be clamped rigidly to the terminal portion of the bracket. To aid in maintaining these parts against relative rotation about bolt 18 I prefer to provide a stud or pin 22 on the bed plate 19 which projects in such a direction from said plate that it can be engaged selectively in any one of the apertures 17. It can be adjusted from one aperture to another only by loosening the wing nut 20. Consequently, the parts are secured together against any likelihood of accidental displacement.

At its rear end the bed plate 19 carries a rod engaging member which may conveniently be formed from a single wire or bar 25 of small diameter bent at 26 to provide an inverted saddle for engagement about the upper surface of a rod handle 27. From the inverted saddle portion 26 of bar 25 the bar extends substantially horizontally as at 28 upon either side of the handle 27 and is thence bent to extend downwardly in the form of the two posts 29. The posts 29 are threaded, and a pair of spaced nuts 30 on each post clampingly engage the bed plate 19 to maintain the bar 25 in the position indicated.

At the end of the bed plate 19 opposite bar 25 the said bed plate is slotted, as indicated at 31 in Figures 5 and 7. The projecting tongues of material upon either side of the slot are bent back upon themselves and turned over to make the eyes 32 which clearly appear in Figures 1 and 6, and are shown in section in Figure 2. Into the eyes 32 is screwed a pivot bolt 33 having a knurled head 34 for its convenient manipulation. A rocking member 35 is fulcrumed on the bolt 33 and carries the forward support for the fishing rod and also a clamp for the rearward end of such rod.

The member 35 is preferably made in the form of a channeled member having downwardly extending flanges 36 apertured at intervals as at 37. The apertures are each adapted to receive bolt 33, thereby providing for the adjustment of the device when desired. The forward support for the fishing rod may comprise a heavy wire or bar similar to that shown at 25 and described above. The single wire 40 is bent at 41 to provide a saddle for the forward portion of the rod handle 27. From the saddle portion 41 the two ends of the bar or wire 40 extend downwardly and rearwardly and pass in close proximity through the channeled rocking member 35 to which they may conveniently be rigidly connected by means of the ears 42 at each end of the said member 35. To maintain the adjacent portions of wire 40 in permanent and parallel connection they may conveniently be surfaced or wound with wire or tape, as shown at 42′ prior to their introduction into the rocking device 35.

After emerging from the rocking member 35 the extremities of wire 40 are led rearwardly between posts 29, and, in passing between such posts, preferably diverge as at 44 and eventually are bent outwardly to a common transverse plane as at 45. The tip ends 45 of wire 40 are adapted to engage the horizontal portions 28 of wire 25 and thereby to limit the oscillatory movement of wire 40 and the rocking member 35 upon bolt 33. Furthermore, if any object be interposed between the inverted saddle 26 and the portions 44 and 45 of the oscillatory bar 40, and if the saddle portion 41 of bar 40 be weighted, the said object will thereupon be clamped at its rear end and will be frictionally held with resistance proportional to the weight applied to the forward end of the bar 40.

Such is the case when a fishing rod is in the position indicated in Figure 1. Practically the entire weight of the rod is supported by saddle 41, and such weight tends to oscillate the rocking member 35 upon the pivot bolt 33 and thereby to clampingly engage the rear end of the rod handle between members 45 and 26. It will be noted that the rod is supported at a slight upward inclination so that if a fish pulls upon a line connected with the tip of the said rod such a pull will be added to the weight of the rod to increase the clamping action of the rod support upon the rear end of the rod handle. Nevertheless, the clamping action of the device may be instantly relieved if the operator lifts the forward end of the rod. Upon such an occurrence the rod may instantly be withdrawn from the device with no resistance whatever.

It frequently happens that a fish will not pull steadily upon a rod but will pull spasmodically thereon, and each pull of the fish will be followed by a period during which the rod will be free to spring upwardly again. The ordinary rod is resilient and when a severe pull upon its extremity is followed by a free period such as that above described the rod may spring upwardly with such momentum as to lift the entire rod from any support upon which it is placed. In the event that such a spring of the rod should result in displacing the rod entirely from saddle 41, the rod would nevertheless be clamped against the danger of accidental loss. Figures 6 and 7 show the rod in a position taken by it subsequent to such a displacement as that above described. It will be noted that the portion of the rod normally engaged in saddle 41 has fallen downwardly at one side of the forward support and has thereby relieved the saddle of its weight. However, in order to clear the saddle the rod is forced to swing laterally, and in so doing it becomes cramped upon one of the posts 29, and the far side of the inverted saddle 26. It has been found in actual practice that a rod so cramped is rigidly held against any likelihood of accidental loss. This feature is regarded as of great importance in view of the severe conditions imposed upon any device for supporting a fishing rod in actual service.

Obviously, the angle at which the rod is supported when properly positioned in this device may be controlled by the number of apertures 37 provided in rocking member 35. It is the work of but a moment to unscrew the pivot bolt 33 and re-engage it to a different aperture 37. Under certain circumstances, the angle of the rod may also be controlled by adjusting the arcuate member 15 upon flange 11 of the clamp 10. The adjustment of these last mentioned parts in combination with the adjustment provided for by wing nut 20 allows a wide range of serviceability for this device which would not otherwise be possible.

I claim:

1. In a device of the character described, the combination with an oscillatory rod support adapted to engage at axially spaced points a rod mounted thereon, of a relatively fixed clamping member adapted to co-operate with a portion of said support, whereby the weight of a rod exerted at one of said points upon said support will be adapted to urge the other of said points in the direction of said relatively fixed member to clamp said rod.

2. In a device of the character described, the combination with a base member, of a rod support fulcrumed to said member and provided at spaced points with a rod receiving saddle and a clamping member, together with a relatively fixed clamping member connected with said base member and mounted for co-operation with the clamping member carried by said rod support, said clamping members being formed to engage a rod between them upon the oscillation of said support.

3. In a device of the character described, the combination with a clamp having two jaws adapted to engage a rod handle between them, one of said jaws being movable with respect to the other, of a rod support spaced from said clamp and operatively connected with the movable jaw thereof to transmit to said jaw a pressure in the direction of said other clamping jaw proportional to the load upon said support.

4. In a device of the character described, the combination with a base plate, of a pair of posts extending normal to said plate, horizontal members extending laterally from said posts in substantial parallelism and interconnected integrally by an upwardly bowed element, a lever fulcrumed upon said plate and providing a rod receiving saddle, and means connected with said lever and positioned for co-operation with said upwardly bowed element.

5. In a device of the character described, the combination with a support, of a pair of uprights projecting thereabove, horizontal arms connected with said uprights and a bow connecting said arms with each other, together with a rod receiving saddle spaced at a distance from said bow and adapted to fulcrum a rod having its end inserted beneath said bow, said bow, said posts, and said saddle being formed to cramp a rod which falls from its normal position in said saddle whereby to secure said rod against loss.

6. In a device of the character described, the combination with a support, of a fitting oscillatory with reference to said support and a bracket composed of wire having intermediate portions secured in said fitting, a part of said wire being upwardly extended and shaped to comprise a concave seat and the end portions of said wire being outwardly divergent to comprise a seat for another portion of a rod engaged by said first mentioned seat.

7. In a device of the character described, the combination with a support, of spaced posts projecting upwardly therefrom, arms extending laterally from said posts and an upwardly bowed member connecting said arms, together with a fitting oscillatory with reference to another portion of said support and a wire secured in said fitting having its ends extended between said posts and outwardly divergent beneath said arms, an intermediate portion of said wire being upwardly bent and including a concave saddle adapted to receive a portion of a fishing rod.

8. In a fishing rod bracket, the combination with a support, of an oscillatory device having a fulcrum with reference to said support and provided at one side of said fulcrum with a saddle and at the other side of said fulcrum with a reduced intermediate portion and an enlarged terminal clamping portion, together with substantially horizontal guides spaced above said support and connected therewith, and an upwardly bowed member connecting said guides and adapted to co-operate with the clamping portion of said device.

9. In a device of the character described, the combination with a supporting element provided with a central hole and a plurality of apertures disposed in a concentric series about said hole, of a fish rod carrying member provided with a stud engageable selectively in said aperture, a bolt extending through said member at substantially the distance from said stud of the radius between said hole and any of said apertures, and a nut on said bolt adapted to engage said member and said element.

10. In a device of the character described, the combination with a support, of a pivot bolt transversely removable from said support, a rocking member provided with a plurality of transverse apertures selectively engageable upon said bolt, and a saddle supported from said rocking member and adapted to receive a fishing rod.

11. In a device of the character described, the combination with a base member and a relatively fixed rod clamping element connected therewith, of an oscillatory fitting fulcrumed to said base member, and a wire bent intermediate its ends to form a saddle disposed above said fitting, said wire extending past said fitting in engagement therewith and projecting from said fitting into operative relation to said relatively fixed clamping element, the extremities of said wire being formed to comprise clamping means co-operative with said relatively fixed element.

CHARLES O. MERCKEL.